(12) United States Patent
Dunn

(10) Patent No.: US 12,498,601 B2
(45) Date of Patent: *Dec. 16, 2025

(54) DISPLAY UNIT WITH MONITORING FEATURES

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/173,174

(22) Filed: Apr. 8, 2025

(65) Prior Publication Data

US 2025/0237902 A1 Jul. 24, 2025

Related U.S. Application Data

(63) Continuation of application No. 18/795,279, filed on Aug. 6, 2024, now Pat. No. 12,298,614, which is a continuation of application No. 18/654,191, filed on May 3, 2024, now Pat. No. 12,117,684, which is a continuation of application No. 18/377,401, filed on Oct. 6, 2023, now Pat. No. 12,007,637, which is a continuation of application No. 17/983,144, filed on Nov. 8, 2022, now Pat. No. 11,815,755, which is a continuation of application No. 17/201,933, filed on Mar. 15, 2021, now Pat. No. 11,526,044.

(Continued)

(51) Int. Cl.
*H05K 7/00* (2006.01)
*G01C 9/06* (2006.01)
*G02F 1/1333* (2006.01)
*G04G 9/00* (2006.01)
*G04G 21/02* (2010.01)
*G09G 3/34* (2006.01)

(52) U.S. Cl.
CPC ......... *G02F 1/133382* (2013.01); *G01C 9/06* (2013.01); *G04G 9/0064* (2013.01); *G04G 21/02* (2013.01); *G09G 3/3406* (2013.01); *G09G 2320/041* (2013.01); *G09G 2330/021* (2013.01)

(58) Field of Classification Search
CPC .. G02F 1/133382; G01C 9/06; G04G 9/0064; G04G 21/02; G09G 3/3406; G09G 2320/041; G09G 2330/021; G09G 3/16; F16M 11/24; G06F 1/203; G08G 1/205
USPC ...................................................... 361/679.01
See application file for complete search history.

(56) References Cited

U.S. PATENT DOCUMENTS

2013/0279090 A1\* 10/2013 Brandt ................... F16M 11/24
361/679.01
2016/0110005 A1\* 4/2016 Yin ....................... G06F 1/1684
345/173

(Continued)

*Primary Examiner* — Abdul-Samad A Adediran
(74) *Attorney, Agent, or Firm* — Standley Law Group LLP; Jeffrey S. Standley; Adam J. Smith

(57) ABSTRACT

Digital signage unit, such as for digital out of home advertising, with monitoring features are provided. The digital signage unit includes an electronic display, a shock sensor, and a controller which receives data from the shock sensor and determines, from time to time, an operating status of the digital signage unit based, at least in part, the data from the shock sensor.

20 Claims, 5 Drawing Sheets

Related U.S. Application Data

(60) Provisional application No. 63/000,612, filed on Mar. 27, 2020.

(56) References Cited

U.S. PATENT DOCUMENTS

| | | | |
|---|---|---|---|
| 2017/0032721 A1* | 2/2017 | Atkinson | G09G 3/16 |
| 2020/0294401 A1* | 9/2020 | Kerecsen | G08G 1/205 |
| 2021/0034101 A1* | 2/2021 | Yildiz | G06F 1/203 |

* cited by examiner

DISPLAY UNIT WITH MONITORING FEATURES

CROSS-REFERENCE TO RELATED APPLICATIONS

This application is a continuation of U.S. application Ser. No. 18/795,279 filed Aug. 6, 2024, which is a continuation of U.S. application Ser. No. 18/654,191 filed May 3, 2024, now U.S. Pat. No. 12,117,684 issued Oct. 15, 2024, which is a continuation of U.S. application Ser. No. 18/377,401 filed Oct. 6, 2023, now U.S. Pat. No. 12,007,637 issued Jun. 11, 2024, which is a continuation of U.S. application Ser. No. 17/983,144 filed Nov. 8, 2022, now U.S. Pat. No. 11,815,755 issued Nov. 14, 2023, which is a continuation of U.S. application Ser. No. 17/201,933 filed Mar. 15, 2021, now U.S. Pat. No. 11,526,044 issued Dec. 13, 2022, which claims the benefit of U.S. provisional patent application Ser. No. 63/000,612 filed Mar. 27, 2020, the disclosures of each of which are hereby incorporated by reference as if fully restated herein.

TECHNICAL FIELD

Exemplary embodiments relate generally to systems and methods for monitoring operations of a display unit based on, at least in part, data from a shock sensor.

BACKGROUND AND SUMMARY OF THE INVENTION

Electronic displays have grown in popularity not only for indoor use, but also for outdoor use. One exemplary application, without limitation, is the digital out of home advertising market where the electronic displays are increasingly replacing the use of static posters. The use of electronic displays is advantageous because such electronic displays permit images to be changed quickly as well as permit the use of videos and interactive displays, among other benefits.

Such outdoor electronic displays experience solar loading. Such solar loading may result in significant heat loads to the electronic display and related components which may result in damage if not thermally managed properly. However, such thermal management efforts require the consumption of additional power. Ambient solar conditions also affect image quality. Electronic display brightness sometimes needs adjusted to make an image visible. The direction an electronic display is facing may affect the amount of solar loading or other exposure received by the electronic display, and thus affect the need to provide thermal management and/or brightness levels, for example. What is needed is a display unit which controls operations based on, at least in part, orientation of the display unit.

A display unit which controls operations based on, at least in part, orientation of the display unit is provided. The display unit may comprise a housing for one or more electronic displays. Such electronic displays, and other components of the display unit, may be cooled or otherwise thermally managed using fans, open loops for ambient air, and/or closed loops for circulating gas, for example. The display unit may comprise a controller. The controller may comprise one or more of: an orientation detection device, an accelerometer, a timekeeping device, a location tracking device, a database, and a sensor. The orientation detection device may comprise a magnetometer, though any type of orientation detection device is contemplated. The aforementioned components may be in electronic communication with a processor, which may be local to or remote from such components. The processor may receive readings from such components. From such readings, one or more of: the tilt angle of the unit, the location of the unit, the time of day, and/or the display unit's direction or other orientation may be determined. From such information, the solar angle relative to each electronic display may be determined. The display unit's operations may be adjusted based upon the solar angle. For example, without limitation, a number of predetermined ranges may be provided and the electronic display's brightness and/or speed of the cooling fans may be adjusted to predetermined criteria for each such range.

As another example, without limitation, such information (e.g., the tilt angle of the unit, the location of the unit, the time of day, and/or the display unit's direction or other orientation) may be used to determine whether or not a display unit is installed properly. For example, without limitation, such information may be used to determine approximate deviation from plumb.

Examples of other such sensors include vibration and/or shock sensors. Data from any of the orientation detection device, the accelerometer, the location tracking device, the vibration sensor, the shock sensor, combinations thereof, or the like may be used to detect damage to the display unit. Such damage may be, for example, without limitation, as a result of vandalism, vehicle collision, natural disaster, or the like. Where such possible damage is detected, such as by exceedance of an impact/shock level, the tilt angle and/or orientation may be determined and compared to expected measure to confirm such damage. Alerts may be provided where such possible damage is detected.

As another example, without limitation, such information (e.g., the tilt angle of the unit, the location of the unit, the time of day, and/or the display unit's direction or other orientation) may be used to determine whether or not a door or other access panel of the unit is opened or closed, assuming the sensor is mounted on or otherwise connected to the door or access panel.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
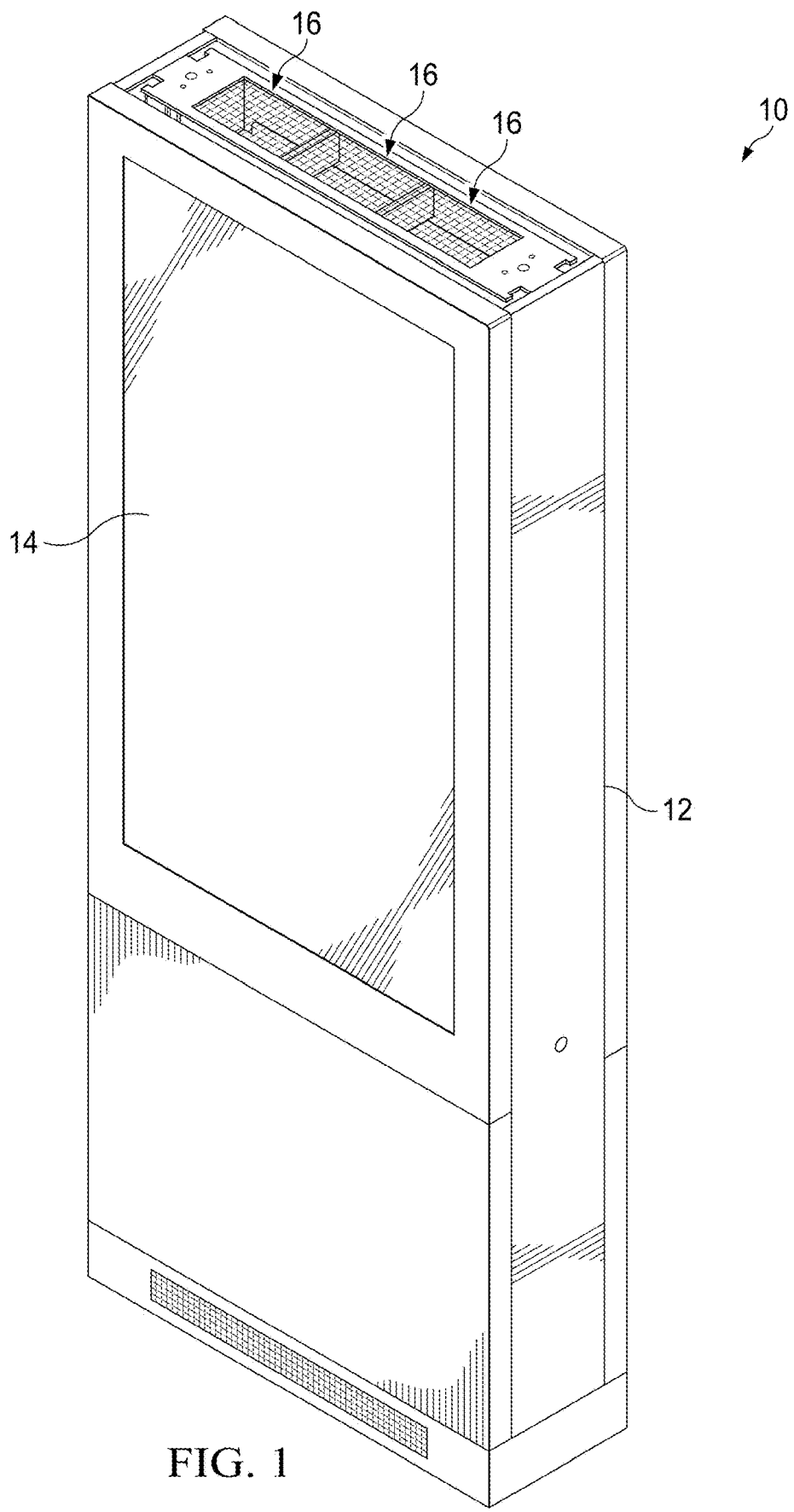
FIG. 1 is a perspective view of an exemplary display unit in accordance with the present invention.

FIG. 1 illustrates a display unit 10. The display unit 10 may comprise a housing 12. One or more electronic displays 14 may be located at the housing 12. The electronic display(s) 14 may be any type, such as, but not limited to, LED, LCD, OLED, rear projection, cathode ray tube, plasma, some combination thereof, or the like. The electronic displays 14 may be directly back lit, edge lit, emissive, passive, transflective, some combination thereof, or the like. The electronic displays 14 may be associated with one or more illumination elements, such as, but not limited to, a backlight, edge light, emissive elements, combinations thereof, or the like. In exemplary embodiments, a first electronic display 14 is positioned at the housing 12 in an opposing arrangement with a second electronic display 14. Any number of electronic displays 14 of any size, shape, location, and/or orientation may be utilized. The same of different types of electronic display 14 may be used in a display unit 10.

The display unit 10 may comprise one or more thermal management systems. The thermal management systems may be those shown and/or described in U.S. Pat. No. 10,499,516 issued Dec. 3, 2019, the disclosures of which are hereby incorporated by reference as if fully restated herein, for example, without limitation. For example, without limitation, one or more apertures 16 may be provided in the housing 12. The apertures 16 may serve as intake points or exhaust points for ambient air. The ambient air may travel through one or more open loop pathways within the housing 12. One or more closed loop pathways for circulating gas may also be located within the housing 12. The open loop pathways and closed loop pathways may thermally interact with one another, such as, but not limited to, at a heat exchanger. An open loop pathway, in exemplary embodiments, may extend along a rear surface of each of the electronic displays 14. A closed loop pathway, in exemplary embodiments, may encircle each of the electronic displays 14. One or more fans may be located along the open loop pathway, the closed loop pathway, some combination thereof, or the like.

Figure 2:
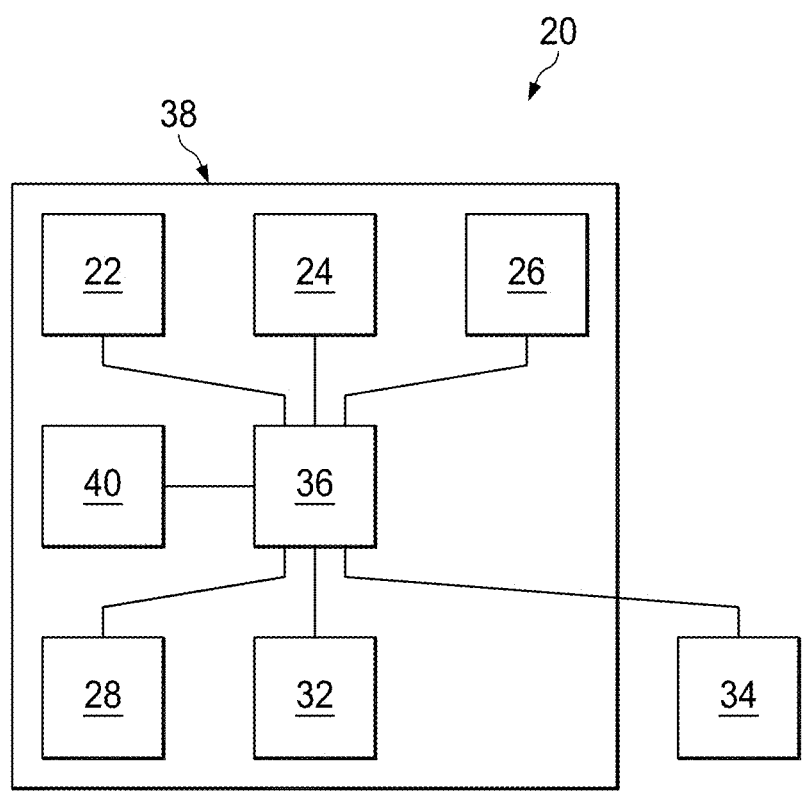
FIG. 2 is a simplified block diagram of an exemplary control unit for the display unit of FIG. 1.

FIG. 2 illustrates a controller 20 for use with the display unit 10. The controller 20 may be located within the housing 12, though any location, including, but not limited, to a remote location, may be utilized. The controller 20 may comprise one or more orientation detection devices 22. The orientation detection device(s) 22 may comprise a magnetometer, accelerometer, motion sensor, location tracking device, compass, gyroscope, some combination thereof, or the like. Other sensors 40 such as, but not limited to, shock and/or vibration sensors may be utilized and placed in electronic communication with the controller 20. The orientation detection device 22 may be configured to determine the direction of the orientation detection device 22, and thus the display unit 10, is facing. Such directional observations may be made in two-dimensions and/or three dimensions. Any kind or type of orientation detection device 22 is contemplated, and combination of such orientation detection devices 22 may be utilized. For example, without limitation, the orientation of the orientation detection device 22 relative to one or more other given components of the display unit 10 may be preprogrammed or known such that the orientation of such given component(s) may be determined from the orientation of the orientation detection device 22.

In exemplary embodiments, the orientation detection device 22 or other device may be located, oriented, calibrated, or otherwise configured to determine the orientation of at least one of the electronic displays 14. For example, without limitation, the orientation detection device 22 may be configured to determine the orientation of each electronic display 14. As another example, without limitation, the orientation detection device 22 may be configured to determine the orientation of the display unit 10 and the orientation of the electronic display(s) 14 may be determined from the known or preprogrammed orientation of the electronic display(s) 14 relative to the orientation detection device 22. As yet another example, without limitation, the orientation detection device 22 may be configured to determine the orientation of a particular one of the electronic displays 14 and the orientation of any remaining electronic display(s) 14 may be determined from the known orientation of the remaining electronic display(s) 14 relative to the orientation detection device 22.

The controller 20 may comprise one or more timekeeping device(s) 24, such as, but not limited to, a GPS receiver, a clock, stopwatch, timer, some combination thereof, or the like. The timekeeping device(s) 24 may be configured to track the time of day. The timekeeping device(s) 24 may be configured to, additionally or alternatively, track the date.

The controller 20 may comprise one or more inclinometers 26. The inclinometers 26 may be configured to determine the tilt angle of the display unit 10. In exemplary embodiments, the inclinometers 26 may be located, oriented, calibrated, or otherwise configured to determine the tilt angle of at least one of the electronic displays 14. The orientation detection device 22 in exemplary embodiments, without limitations, may serve as the inclinometers 26, though not required.

The controller 20 may comprise one or more location devices 28. The location devices 28 may be GPS devices, though any type of location tracking or determining device may be utilized. The location devices 28 may be configured to determine the location of the display unit 10.

In exemplary embodiments, the location tracking device of the orientation detection device 22 or otherwise may also serve as the timekeeping device 24. For example, without limitation, a GPS based device may provide location detection as well as time keeping.

The controller 20 may comprise one or more databases 32. The databases 32 may comprise solar position data such as, but not limited to, sunrise times, sunset times, solar intensity, solar path information, solar angle information, some combination thereof, or the like. The solar position information may be location, time, and/or date specific. Alternatively, or additionally, network communication devices may be provided to connect to one or more remotely located databases 32.

The one or more of the orientation detection devices 22, timekeeping devices 24, inclinometers 26, location devices 28, and/or databases 32 may be in electronic communication with one or more processors 36. The processors 36 may be in electronic communication with one or more thermal management components 34. Such thermal management components 34 may comprise one or more fans, illumination devices for the electronic displays 14 (e.g., LEDs), air conditioning devices, heat pumps, thermoelectric coolers, some combination thereof, or the like. The processor(s) 36 may be configured to receive data from such thermal management component(s) 34 such as, but not limited to, fan operation status, fan speed, air flow, temperatures, some combination thereof, or the like.

The various components of the controller 20 may be located within a controller housing 38, or may be located at one or more locations throughout the display unit 10, and/or may be located remote from the display unit 10. In exemplary embodiments, some components of the controller 20 may be located within the controller housing 38 and others may be located elsewhere, such as, but not limited to, remote from the display unit 10. Where at least some components of the controller 20 are remote from the unit 10, communication with the remaining components of the controller 20 and/or other components of the display unit 10 may be made by way of one or more network communication devices. In other exemplary embodiments, certain components of the controller 20 may not be required and instead may be predetermined, such as through user input. By way of a non-limiting example, the location of the display unit 10 may be predetermined, programmed, and/or provided such that the one or more location devices 28 are not required. Communication between any such components of the display unit 10 or remote therefrom may be accomplished by wired and/or wireless connection.

Figure 3:
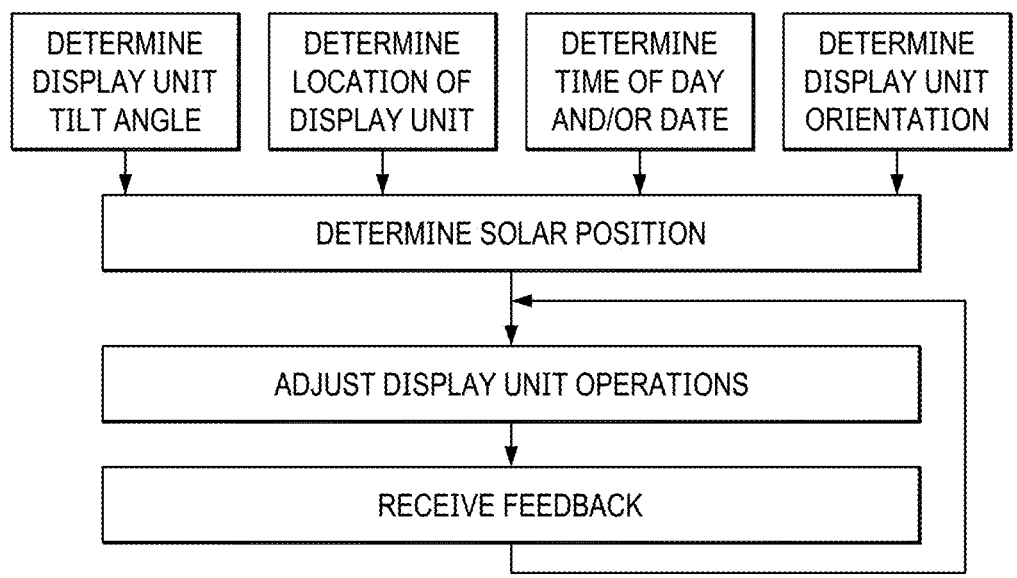
FIG. 3 is a flow chart with exemplary logic for use with the controller of FIG. 2.

FIG. 3 is a flow chart with exemplary logic for use with the controller 20. The tilt angle of the display unit 10 may be determined. In exemplary embodiments, the tilt angle may be determined from data received from the one or more inclinometers 26. Alternatively, or additionally, the tilt angle may be determined by the orientation detection device 22. The location of the display unit 10 may be determined. In exemplary embodiments, the location may be determined from data received from the one or more location devices 28, though the location may alternatively, or additionally, be pre-programmed. The time of day may be determined. In exemplary embodiments, the time of and/or date may be determined from data received from the one or more timekeeping devices 24. The direction the display unit 10 is facing may be determined. In exemplary embodiments, the direction the display unit 10 is facing may be determined from data received from the one or more orientation detection devices 22.

The solar position may be determined. The solar position may be measured by the solar angle. The solar angle may be determined relative to the display unit 10, a particular one of the one or more electronic displays 14, and/or each of the one or more electronic displays 14. The solar angle may be determined relative to other components of the display unit 10. The solar angle may be determined, in exemplary embodiments, by retrieving the solar data from the database 32 indicating the position of the sun for the location, the time of day, and/or the date. Additionally, the tilt angle of the display unit 10 may be used to determine the solar angle relative to the surface of each of the one or more electronic displays 14. By way of a non-limiting example, where the sun is located at 45 degrees relative to the horizon, and the display unit 10 and/or the electronic display 14 is located at 5 degrees upward angle relative to the horizon, the solar angle may be determined to be 40 degrees. Additionally, or alternatively, the direction of the display unit 10 may be used to determine the solar angle relative to the surface of each of the one or more electronic displays 14. By way of a non-limiting example, where back-to-back electronic displays 14 are utilized, the solar angle for a first one of electronic displays 14, which faces the sun, may be 20 degrees, while the solar angle for a second one of the electronic displays 14 may be zero and/or a negative, which faces away from the sun.

The determination of the solar angle may be used to adjust operations of the display unit 10. For example, without limitation, where the solar angle is likely to result in greater sun exposure and/or solar loading, the controller 20 may be configured to increase fan speed, increase brightness of the electronic displays 14, some combination thereof, or the like. This may improve cooling and/or image quality. Where, for example, without limitation, the solar angle is likely to result in reduced sun exposure and/or solar loading, the controller 20 may be configured to decrease fan speed, decrease brightness of the electronic display 14, some combination thereof, or the like. This may decrease power consumption.

Such determinations and alternations to display operations may be done based solely on solar angle or in conjunction with other data measures such as, but not limited to, ambient weather conditions, ambient lighting conditions, combinations thereof, or the like. For example, without limitation, weights may be applied to each factor and/or certain factors may be prioritized.

The solar angle may be measured relative to the horizon, a particular cardinal direction (e.g., north, south, east, or west), zenith, some combination thereof, or the like. The solar angle calculated may comprise the attitude, elevation, azimuth, zenith, some combination thereof, or the like. Solar angle may be measured using known or yet to be developed techniques.

Feedback may be received and operations of the display unit 10 may be further adjusted as needed. For example, without limitation, temperature readings may be taken from the thermal management components 34 to ensure temperatures are within predetermined ranges and fan speed may be increased or decreased accordingly. As another example, without limitation, illumination readings of illumination elements for the electronic displays 14 may be taken from the thermal management components 34 to ensure the electronic displays 14 are illuminated properly and illumination may be increased or decreased to meet predetermined criteria.

Figure 4:
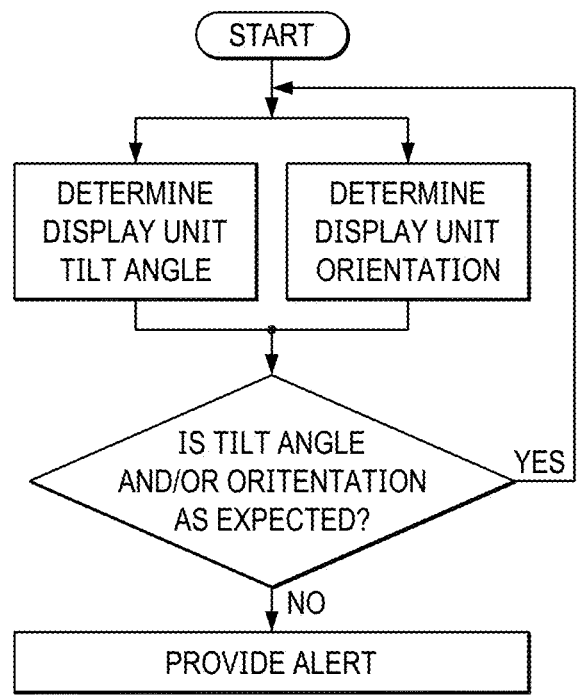
FIG. 4 is a flow chart with other exemplary logic for use with the controller of FIG. 2.

FIG. 4 illustrates other exemplary logic for the controller 20. Display unit 10 tilt readings from the inclinometer(s) 26 and/or orientation readings from the orientation detection device(s) 22 may be used to determine whether or not a display unit is installed properly. For example, without limitation, such information may be used to determine approximate deviation of the display unit 10 or components thereof from plumb or other predetermined design measure.

Data from the orientation detection device 22, the inclinometer(s) 26, and/or the other sensors 40 may be used to detect damage to the display unit 10. Such damage may be, for example, without limitation, as a result of vandalism, vehicle collision, natural disaster, or the like. For example, without limitation, certain readings from the other sensors 40, such as, but not limited to, shock and/or vibration sensors, may indicate damage to the unit 10. Following detection of such possible damage and/or as part of routine assessment, data from the orientation detection device 22 may be used to remotely confirm and/or assess the extent of such possible damage. In exemplary embodiments, where readings from the other sensors 40 indicate damage to the unit 10, data from the orientation detection device 22 may be automatically retrieved to confirm and/or assess the extent of such possible damage. For example, without limitation, if the tilt angle and/or orientation deviates from an expected parameter by more than a threshold, the existence of damage may be considered confirmed. The expected parameter may be a design parameter, last reading, a predetermined threshold, combinations thereof, or the like. If a finding of damage is confirmed, an electronic notification and/or data regarding the same may be sent to one or more remote devices.

Figure 5:
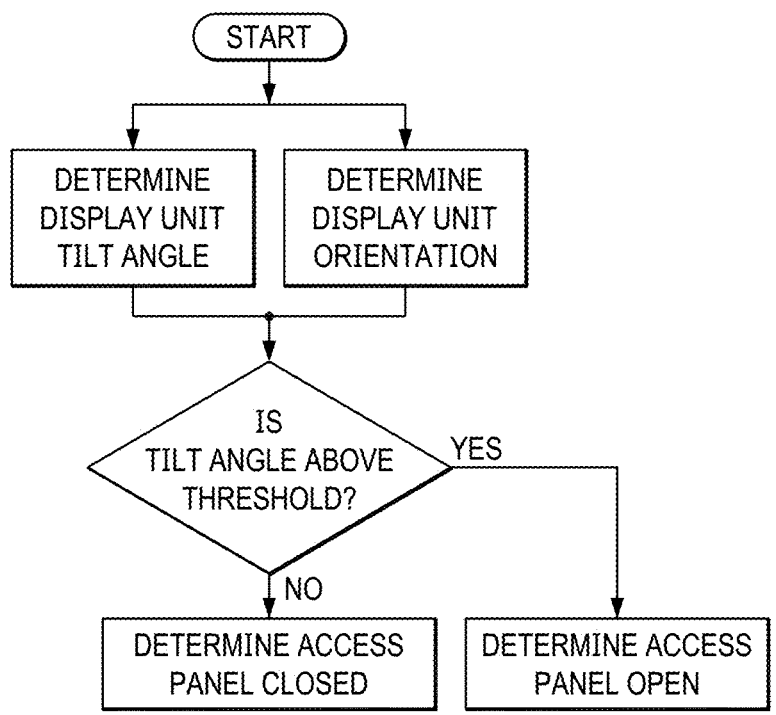
FIG. 5 is a flow chart with other exemplary logic for use with the controller of FIG. 2.

FIG. 5 illustrates other exemplary logic for the controller 20. Some or all of the orientation detection device 22 may be positioned on a particular part of the display assembly 10 to determine the position of the particular part of the display assembly 10 relative to a remaining or other portion of the display assembly 10. For example, without limitation, some or all of the orientation detection device(s) 22 may be placed in one or more access panels (e.g., door), side assemblies, or other framework comprising the electronic display 14, combinations thereof or the like, and may be used to determine whether or not such portion of the display unit 10 is in an opened or closed position. For example, such portions may be moveable relative to a frame, the housing 12, installation mount, or other structure which may be, directly or indirectly, installed at or otherwise connected to a ground surface, sidewalk, building, wall, vehicle roof, combinations thereof, or the like. In this way, the opened or closed nature of such portions may be determined relative to such a frame, housing 12, installation mount, or other structure. In exemplary embodiments, angles or orientations beyond a predetermined threshold (e.g., 10 degrees) may indicate the portion in an opened position. The predetermined threshold may be set relative to a fixed point (e.g., horizontal or vertical), or to an expected threshold (e.g., 0 degrees, 45 degrees, 90 degrees, etc.).

The display unit 10 may comprise one or more network connection devices. The network connection devices may facilitate connection to one or more intranets, internets, cellular networks, the world wide web, combinations thereof, or the like. With the location and/or time information from the location tracking device and/or the time keeping device as well as network connectivity, the display unit 10 may be configured to retrieve a number or various datapoints. Such datapoints may be received at the controller 20 and may be utilized to alter display operations. For example, without limitation, such datapoints may include near real time environmental conditions (e.g., relative humidity, wind speed/direction, barometric pressure, temperature, precipitation, cloud cover, solar intensity, UV index, sunset/sunrise times, combinations thereof, or the like). The controller 20 may use such data, by itself and/or in combination with the solar angle information, to control one or more thermal management components 34, such as, but not limited to, the fans, illumination devices, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing devices. The electronic devices may be personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A display unit with monitoring features, said display unit comprising:
    an electronic display;
    a shock sensor; and
    a controller comprising subcomponents, said subcomponents including at least one of: an orientation detection device, an accelerometer, a timekeeping device, a location tracking device, and a database, wherein each of the subcomponents is in connection with a processor, and wherein said controller is configured to:
    receive data from said shock sensor; and
    determine, from time to time, an operating status of the display unit based, at least in part, on the data from the shock sensor.

2. The display unit of claim 1 wherein:
    the controller is configured to: where a determination is made that the operating status of the display unit is in a likely damaged state, cause an electronic notification to be generated and transmitted from the display unit to at least one remote electronic device.

3. The display unit of claim 2 wherein: the subcomponents include the orientation detection device; and
    the controller is configured to:
    receive orientation data from the orientation detection device; and
    determine the operating status of the display unit based, at least in part, on the orientation data.

4. The display unit of claim 3 wherein:
    the controller is configured to:
    make an initial determination of the operating status based on the data from the shock sensor; and
    make a further determination of the operating status based on the orientation data.

5. The display unit of claim 4 wherein:
    the controller is configured to:
    make the initial determination that the operating status of the display unit is in a may be damaged state where the data received from the shock sensor exceeds a predetermined threshold; and
    make the further determination that the operating status of the display unit is in the likely damaged state where, following the initial determination that the operating status of the display unit is in the may be damaged state, the orientation data taken at or subsequent to the initial determination indicates an orientation of the display unit outside of one or more predetermined parameters.

6. The display unit of claim 3 wherein:
the orientation detection device comprises at least one of: a magnetometer, a gyroscope, or a compass.

7. The display unit of claim 3 wherein:
the controller is configured to: adjust operations of the electronic display based, at least in part, on the orientation data received from the orientation detection device.

8. The display unit of claim 7 wherein:
the orientation data comprises at least one of: azimuth and elevation.

9. The display unit of claim 2 wherein: the subcomponents include a tilt sensor, wherein the controller is configured to:
receive tilt data from the tilt sensor; and
determine the operating status of the display unit based, at least in further part, on the tilt data.

10. The display unit of claim 9 wherein:
the controller is configured to:
make an initial determination of the operating status of the display unit based on the data received from the tilt sensor; and
make a further determination of the operating status of the display unit based on the tilt data from the tilt sensor.

11. The display unit of claim 10 wherein:
the controller is configured to:
make the initial determination that the operating status of the display unit is in a may be damaged state where the data received from the shock sensor exceeds a predetermined threshold; and
make the further determination that the operating status of the display unit is in the likely damaged state where, following the initial determination that the operating status of the display unit is in a may be damaged state, the tilt data taken at or subsequent to the initial determination indicates an angle of the display unit outside of one or more predetermined parameters.

12. The display unit of claim 11 wherein:
the tilt sensor comprises an inclinometer.

13. The display unit of claim 11 wherein:
the tilt sensor comprises an orientation detection device.

14. The display unit of claim 1 further comprising:
a thermal management subsystem comprising at least one airflow pathway and one or more fans located along the at least one airflow pathway, wherein the controller is configured to operationally control the electronic display and the thermal management subsystem.

15. The display unit of claim 14 wherein:
the electronic display comprises a directly backlit, liquid crystal display.

16. The display unit of claim 1 further comprising:
a structural framework; and
a housing for the electronic display, where said housing is movably attached to said structural framework.

17. A method of remotely monitoring a display unit, said method comprising:
providing the display unit, said display unit comprising:
an electronic display;
a shock sensor; and
a controller comprising subcomponents, said subcomponents including at least one of: an orientation detection device, an accelerometer, a timekeeping device, a location tracking device, and a database, wherein each of the subcomponents is in connection with a processor;
receiving, from time to time, at the controller, data from said shock sensor; and
determining, from time to time, at the controller, an operating status of the display unit based, at least in part, on the data received from the shock sensor.

18. The method of claim 17 further comprising:
determining, in at least one instance at the controller, that the operating status of the display unit is in a likely damaged state, and, in response, causing, by way of the controller, an electronic notification to be generated and transmitted from the display unit to at least one remote electronic device.

19. The method of claim 18: wherein the subcomponents include the orientation detection device; and further comprising receiving, at the controller from the orientation detection device, orientation data, wherein the step of determining the operating status of the display unit is based, at least in part, on the orientation data.

20. A display unit with monitoring features, said display unit comprising:
an electronic display;
a shock sensor; and
a controller comprising subcomponents, said subcomponents comprising at least one of: an orientation detection device and a tilt sensor, wherein each of said subcomponents is in connection with a processor, and wherein said controller is configured to:
receive data from said shock sensor;
receive orientation data or tilt data from the orientation detection device or the tilt sensor; and
determine, from time to time, an operating status of the display unit based, at least in part, on the data from the shock sensor and the orientation data or the tilt data from the orientation detection device or the tilt sensor.

* * * * *